Patented May 14, 1935

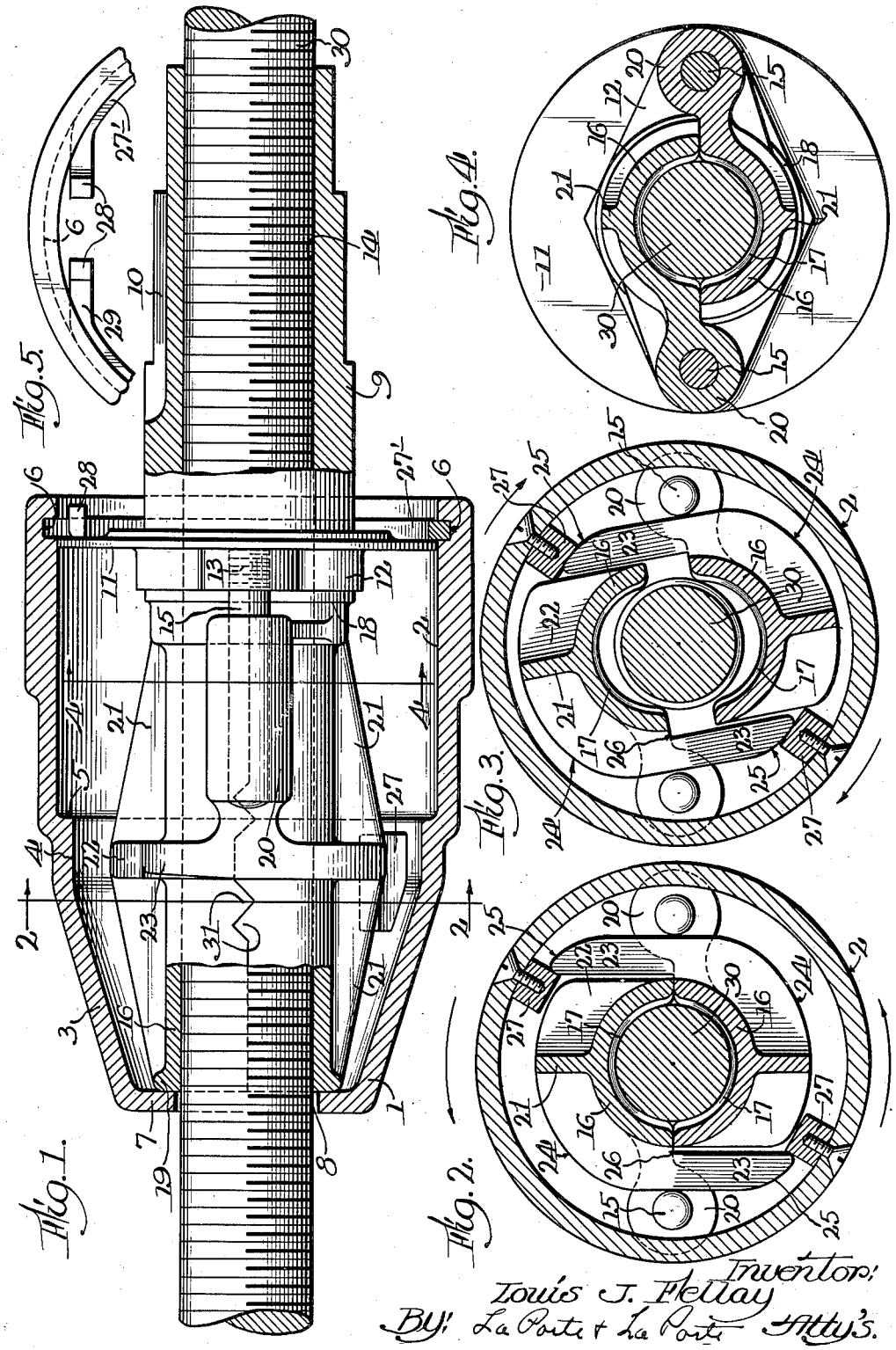

2,001,057

UNITED STATES PATENT OFFICE 2,001,057

DRILL BOXING

Louis J. Fellay, Peoria, Ill., assignor to Dooley Bros., Peoria, Ill., a corporation of Illinois Application December 30, 1933, Serial No. 704,603

6 Claims. (Cl. 255—47)

This invention has reference to a drill boxing, and although not limited in its application, it is particularly adapted for use in connection with coal, rock, and similar types of drilling machines.

The invention has for one of its objects an improvement in the mode of attachment of the drill boxing to the drum shaft.

The invention has for a further object an improved liner assembly for the drill boxing and to an improved mode of connecting such assembly to the drum shaft.

A further object of the invention is to provide an improved liner assembly for a drill boxing and comprises a pair of separable and pivotally supported threaded liners, and coacting means between the housing and the liners to provide for locking the liners in threaded engagement with a threaded shaft or feed bar upon the rotation of the housing in one direction, and for releasing such liners from said shaft upon the rotation of the housing in an opposite direction.

A further object of the invention is to provide the separable liners with coacting guiding and engaging means to insure the proper seating of the threads of the liners on the threads of the thread bar.

The invention has for a still further object a housing for a drill boxing of preferably annular and tapered formation from end to end with a substantially smooth and uninterrupted exterior surface, whereby to eliminate all outward projections from such boxing, thus permitting rotation of the boxing, under certain operating conditions, without danger to the operator.

Other and further objects will more fully appear from the following description.

That the invention may be more fully understood, reference is had to the accompanying drawing forming part of this description, illustrating a preferred embodiment of the invention, in which:—

Fig. 1 is a longitudinal sectional view through the boxing, showing the assembly of the boxing, the drum shaft, the liners and threaded bar, parts of the drum shaft, liners and threaded bar, being shown in full lines partly broken away;

Fig. 2 is a cross section as the same would appear if taken on the line 2—2, Fig. 1, looking in the direction of the arrows and with the liners shown in locked engagement with the threaded bar;

Fig. 3 is a cross section, similar to Fig. 2, but with the boxing rotated from the position shown in Fig. 2 to a position removing the liners from threaded engagement with the threaded bar;

Fig. 4 is a cross section as the same would appear if taken on the line 4—4 of Fig. 1 looking in the direction of the arrows of such figure, and Fig. 5 is a detail showing the slip ring locking and releasing means for attaching and detaching the housing of the boxing on the drum shaft.

Like characters of reference denote corresponding parts throughout the figures.

In the drawing, the housing of the boxing is designated 1 and is shown preferably consisting of the annular tubular portion 2 and the tapered end portion 3 which interiorly merges into the annular portion 2 through an annular portion 4 off-set or shouldered as at 5. The disclosure shows an exterior surface which is substantially smooth and uninterrupted annularly and throughout the length of the housing, whereby to obviate any surface projections which might prove dangerous to an operator and which would engage his clothing when, and in the event the boxing would be caused to operate, under certain operating conditions. In effect, the housing presents a tapered outer surface, from end to end, with such surface configurations as will provide for the interior annular tubular portion and the tapered interior portion, merging thereinto as indicated, to provide for the assembly of the housing, the liners, and the drum shaft and to allow for the necessary expansible movement of the liners for engagement and/or disengagement with the threaded bar. The housing is provided interiorly and at or near its inner end with an annular groove or recess 6 for the seating of the means for locking the housing on the drum shaft. The opposite end of the housing, that is, the small tapered portion is provided with an abutment end wall 7 having an opening 8 therein through which a threaded bar may protrude.

The drum shaft 9 is of tubular sleeve-like formation of suitable length to adapt it for connection with a clutch assembly, not shown, but of the usual type, and is provided with a key-way 10 for effecting such securement to a clutch assembly. I provide one end of the drum shaft 9 with an annular plate-like member 11, the diameter of which is substantially the diameter of the interior of the part 2 of the housing, whereby to permit such plate-like member to be slipped into and removed from the part 2. Projecting outwardly from the plate-like member 11 and forming an integral part with the drum shaft 9, is an extension 12 of substantially diamond shape, and in one direction is the full width of the plate-like member 11 and in the other direction of substantially lesser width, as shown in Fig. 4. Said extension 12 functions as an abutment, as will appear, and the opposite ends of its greatest width are provided with threaded seats 13 and the entire length of the drum shaft and its component parts, described, have a circular opening 14 extending therethrough for the reception and movement of a threaded bar therein. In other words, the opening through the drum shaft provides a smooth surface contact for the reciprocal movement of a threaded bar therein. Secured within the threaded seats 13 and projecting therefrom a suitable distance are pins 15.

16 designates sectional liners, which are substantial duplicates of each other. They are of suitable length and are each provided with the semi-circular interiorly threaded portions 17 which are adapted to coact and form a nut when brought into engagement with a threaded shaft or threaded bar. One end of each of the liners is provided with an abutment portion 18 adapted to bear against the front face of the extension 12 on the drum shaft 9 and at their opposite ends, they have abutment portions 19 adapted to bear against the end wall 7 of the housing, all of which is best seen in Fig. 1 showing the assembly of the complete boxing. Each of the liners is provided at or near one end with elongated tubular portions 20 to adapt them to have telescopic connection with the pins 15 to provide a connection between the liners and the drum shaft and also provide for a pivotal connection of each of the liners on a pin 15 to permit the liners to have movement toward and from each other and for connection and disconnection with the threads on a feed bar or shaft. Extending longitudinally of each liner and projecting radially therefrom is a reinforcing or strengthening rib 21 which have their greatest thickness preferably at a point mediate the ends of the liners, as shown in Fig. 1. Each liner is also provided at the point of greatest thickness of its rib 21 with a radial rib 22 terminating in an extension 23 and each rib and its extension have a continuing cam-like surface 24 terminating in a more or less sharply inwardly inclined cam-like surface 25 at the end of its extension. These extensions are offset slightly from the liners, as indicated at 26, and extend forwardly from its liner, so that when the liners are assembled in pivoted relation with respect to each other, these extensions overlie the opposite ends of the ribs 22, respectively, as shown in Figs. 2 and 3. Adapted as stop members in one instance and also as actuating means in another instance, are lugs 27 which are suitably secured to the inner wall of the housing 1, disposed diametrically opposite each other, and located on the surface portion 4, so that they are permitted, in the rotation of the housing to ride on or adjacent a cam surface 24 and to have abutting engagement with an end of an extension 25 of a liner.

When assembling the various elements of the drill boxing, the pins 15 having been secured to the drum shaft 9, the liners are coupled to said drum shaft by slipping the tubular portions 20 of the liners over the respective pins 15 until the abutting end portions 18 of the liners are brought into bearing relation with the extension 12 on the drum shaft. This accomplished, the housing 1 is slipped over the assembled liners and the plate-like portion 11 until the abutting end portion 19 of the liners bear against the end 7 of the housing. In this position the plate-like member 11 is within the housing and beyond the inside wall of the groove or recess 6, as shown in Fig. 1. To lock the parts in this position, I employ a split spring-like slip ring 27' having finger gripping portions 28 formed or provided on substantially angular portions 29 at the opposite ends of the ring, see Fig. 5. The operator will slip this split ring over the drum shaft 9 and by gripping the finger grips 28 to partially collapse said ring, the ring may be slipped into the groove or recess 6 in the housing 1 and in releasing the ring, it will expand and seat itself in such groove or recess 6, as shown in Figs. 1 and 5 and provide a lock against which the ring-like portion will bear and in this manner secure the assembled liners and drum shaft to the housing. To release these parts from the housing, the operator will grip the finger like portions 28 of the ring 27 and thereby collapse the ring so as to permit it to be removed from said groove or recess 6 and allow for the disassembly of the parts. The parts having been assembled, a threaded feed bar or shaft 30 may be inserted through the drum shaft and through the liners to be engaged and disengaged by the threaded portions thereof.

For guiding the sections of the liners into effecting seating relation with the threads on the threaded bar 30, I provide the sections of the liners with inter-fitting tooth-like portions 31, see Fig. 1.

It will be understood that the end of the feed bar 30 which protrudes from the drum shaft 9 is that end of the feed bar which is designed to be connected with the power unit for actuating the feed bar, and the opposite end of said feed bar is the end which is designed to have connected thereto an auger or drilling tool.

What I claim is:

1. In a device of the character described, in combination, a housing, a pair of coacting threaded liners arranged for assembly in said housing, a drum shaft and means to connect the same with said liners, and a collapsible spring member adapted for connection within said housing for locking the drum shaft, liners and housing in assembled relation.

2. In a device of the character described, in combination, a housing having an annular recess opening out of its inner surface near one end of the housing, a pair of coacting threaded liners arranged for assembly in said housing, a drum shaft having an annular plate adapted for a smooth fit within said housing and for lying alongside said recess, means to connect the drum shaft and liners, and a collapsible split ring adapted for seating relation in said recess to provide a lock for the liner and drum shaft assembly in said housing, said ring provided with finger gripping portions to permit manual placement and removal of said ring.

3. In a drill boxing, the combination with a threaded bar, of a housing cylindrically tapered from one end to the other and having a substantially smooth and uninterrupted exterior surface, a drum shaft having an end disposed within the housing, a pair of coacting threaded liners arranged for engagement with the threaded bar and each having a swingable connection with said drum shaft to permit movement of the liners toward and from the threaded bar, each liner having a cam-like surface, and a pair of diametrically disposed projections within the housing, each adapted on the rotation of the housing in one direction to bear against the cam-like surface of a liner to move the liner into threaded engagement with the threaded bar and on the rotation of the housing in the opposite direction to bear against the cam-like surface of the opposed liner to cause the movement of the liner out of engagement with the threaded bar.

4. In a drill boxing, the combination with a threaded bar, of a housing, a pair of coacting threaded liners within the housing embracing the threaded bar, means to hingedly support said liners for movement toward and from each other, each liner provided with a radially projecting rib and an extension thereof with a continuing cam-like surface, and a pair of diametrically disposed members projecting inwardly from the inner surface of said housing and adapted to bear, respectively, on the cam-like surface of each liner when the housing is rotated in opposite directions; the rotation of the housing in one direction closing the liners into threaded engagement with the threaded bar and the rotation of the housing in the opposite direction opening the liners out of threaded engagement with the threaded bar.

5. In a drill boxing, the combination with a threaded bar, a manually operable housing adapted for rotational movement in opposite directions about said bar, said housing having a substantially smooth and uninterrupted exterior surface, a pair of coacting threaded liners within the housing embracing the threaded bar, means to support said liners for movement toward and from each other, each liner provided with an exterior bearing surface and means disposed on the inner surface of said housing adapted to coact with the bearing surface of said liners when the housing is manually rotated in opposite directions; the rotation of the housing in one direction closing the liners in threaded engagement with the threaded bar and the rotation of the housing in the opposite direction opening the liners out of threaded engagement with the threaded bar.

6. In a drill boxing, the combination with a threaded bar, a manually operable housing adapted for rotational movement in opposite directions about said bar, said housing having a substantially smooth and uninterrupted exterior surface, a pair of coacting threaded liners within the housing embracing the threaded bar, means to support said liners for movement toward and from each other, each liner provided with an exterior bearing surface, means disposed on the inner surface of said housing adapted to coact with the bearing surface of said liners when the housing is manually rotated in opposite directions; the rotation of the housing in one direction closing the liners in threaded engagement with the threaded bar and the rotation of the housing in the opposite direction opening the liners out of threaded engagement with the threaded bar and means for locking the liners and housing in assembled operative relation.

LOUIS J. FELLAY.